(12) United States Patent
Singh et al.

(10) Patent No.: US 8,107,435 B1
(45) Date of Patent: Jan. 31, 2012

(54) METHOD AND SYSTEM OF SWITCHING BETWEEN COVERAGE AREAS

(75) Inventors: Jasinder P. Singh, Olathe, KS (US); Bhagwan Khanka, Lenexa, KS (US); Sachin R. Vargantwar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 394 days.

(21) Appl. No.: 12/488,163

(22) Filed: Jun. 19, 2009

(51) Int. Cl.
*H04Q 7/00* (2006.01)
(52) U.S. Cl. ......... 370/331; 370/428; 455/436; 714/776
(58) Field of Classification Search .................. 370/331, 370/428; 455/436; 714/776
See application file for complete search history.

(56) References Cited

U.S. PATENT DOCUMENTS

| | | | |
|---|---|---|---|
| 2006/0252428 A1* | 11/2006 | Agashe et al. | 455/436 |
| 2007/0008928 A1* | 1/2007 | Kezys | 370/331 |

\* cited by examiner

*Primary Examiner* — Phuoc Doan

(57) ABSTRACT

An access terminal may be requesting from an access network data in a first coverage area at a first data rate, which is determined based on at least one signal condition of the first coverage area. The access terminal may then decide to switch from requesting data in a first coverage area to requesting data in a second coverage area. In response, the access terminal may (a) request data in the first coverage area at an increased second data rate and (b) send to the access network a notification of the decision to switch from requesting data in a first coverage area to requesting data in a second coverage area. After sending the notification, the access terminal may request data in the second coverage area at a third data rate, which is determined based on at least one signal condition of the second coverage area.

20 Claims, 4 Drawing Sheets

METHOD AND SYSTEM OF SWITCHING BETWEEN COVERAGE AREAS

BACKGROUND

In a typical cellular radio communication system, an area is divided geographically into a number of wireless coverage areas such as cells and sectors, each defined by a radiation pattern from one or more base station antennae of an access network. As an access terminal moves between coverage areas of the access network, when network conditions change, or for other reasons, the access terminal may switch from receiving service in one coverage area to receiving service in another coverage area. In a usual case, this switching process is triggered by the access terminal monitoring the signal conditions in various available coverage areas of the access network, and the access terminal and/or the access network determining when one or more threshold criteria are met.

In one typical example, the access terminal may monitor signal strength in various available coverage areas and then decide to switch to a new coverage area when the new coverage area has a signal strength that is sufficiently higher than the coverage area in which the access terminal is currently requesting service. The access terminal may then notify the access network of its decision to switch coverage areas. In turn, the access network may carry out the access terminal's decision to switch coverage areas by ending service of the access terminal in the current coverage area and beginning service of the access terminal in the new coverage area. While this arrangement generally works well to facilitate seamless service of the access terminal as it moves between wireless coverage areas, delays may occur during the switching process, impacting throughput. One factor that may contribute to this delay is an access terminal's inability to switch to the new coverage area while the access terminal is still receiving data in the current coverage area. Accordingly, a more efficient process for an access terminal to switch between coverage areas is desired.

OVERVIEW

Disclosed herein are methods, carried out by an access terminal, of switching between coverage areas of an access network. A first method of switching between coverage areas of an access network may include (a) requesting, from an access network, data in a first coverage area at a first data rate, wherein the first data rate is determined based on at least one signal condition of the first coverage area, (b) deciding to switch from requesting data in a first coverage area to requesting data in a second coverage area (c) in response to deciding to switch from requesting data in the first coverage area to requesting data in the second coverage area, (1) requesting data in the first coverage area at a second data rate, wherein the second data rate is higher than the first data rate, and (2) sending to the access network a notification of the decision to switch from requesting data in a first coverage area to requesting data in a second coverage area, and (d) after sending the notification, requesting data in the second coverage area at a third data rate, wherein the third data rate is determined based on at least one signal condition of the second coverage area.

A second method of switching between coverage areas of an access network may include (a) sending to an access network, on a data rate control (DRC) channel, one or more transmissions each with a DRC indicating a first coverage area and DRC value indicating a first data rate, wherein the first data rate is determined based on at least one signal condition of the first coverage area, (b) deciding to switch from requesting data in a first coverage area to requesting data in a second coverage area; (c) in response to deciding to switch from requesting data in the first coverage area to requesting data in the second coverage area, sending to the access network (1) on the DRC channel, one or more transmissions each with a DRC cover indicating the first coverage area and a DRC value indicating a second data rate, wherein the second data rate is higher than the first data rate, and (2) on a data source control (DSC) channel, a first transmission with a DSC cover indicating the second coverage area, and (d) after sending the first transmission on the DSC channel, sending to the access network, on the DRC channel, one or more transmissions each with a DRC cover indicating the second coverage area and a DRC value indicating a third data rate, wherein the third data rate is determined based on at least one signal condition of the second coverage area.

Advantageously, the exemplary methods described herein may reduce a delay in switching coverage areas that can occur when an access terminal is still receiving data in the first coverage area when the access terminal is ready to begin requesting and receiving data in the second coverage area. In particular, because an access terminal operating according to an exemplary method begins requesting data in the first coverage area at an increased second data rate in response to deciding to switch coverage areas, the access network may reduce the number of timeslots allocated for each data packet to the access terminal. As a result, the access network may finish sending data to the access terminal in the first coverage area—and the access terminal may finish receiving the data—more quickly. In turn, the access terminal can begin requesting data in the second coverage area more quickly.

The first data rate, which is determined based on at least one signal condition of the first coverage area, may take various forms. In one example, the first data rate may be a highest sustainable data rate in the first coverage area. Similarly, the third data rate may be a highest sustainable data rate in the second coverage area. In another example, the first data rate may be a decreased version of the highest sustainable data rate in the first coverage area. Similarly, the third data rate may be a decreased version of the highest sustainable data rate in the second coverage area. In either case, the at least one signal condition of the first coverage area and the at least one signal condition of the second coverage area may include a carrier-to-interference ratio and/or a signal-to-interference-plus-noise ratio.

The second data rate may also take various forms. In one example, the second data rate may be a predefined data rate, such as a maximum data rate supported by the access network. In another example, the second data rate may be an increased version of the first data rate. Other examples are possible as well.

Also disclosed herein is an access terminal that includes (a) a communication interface for communicating with an access network, (b) a processor, (c) data storage, and (d) program instructions stored in the data storage and executable by the processor for carrying out one or more methods described herein.

These as well as other aspects and advantages will become apparent to those of ordinary skill in the art by reading the following detailed description, with reference where appropriate to the accompanying drawings.

DETAILED DESCRIPTION

Figure 1:
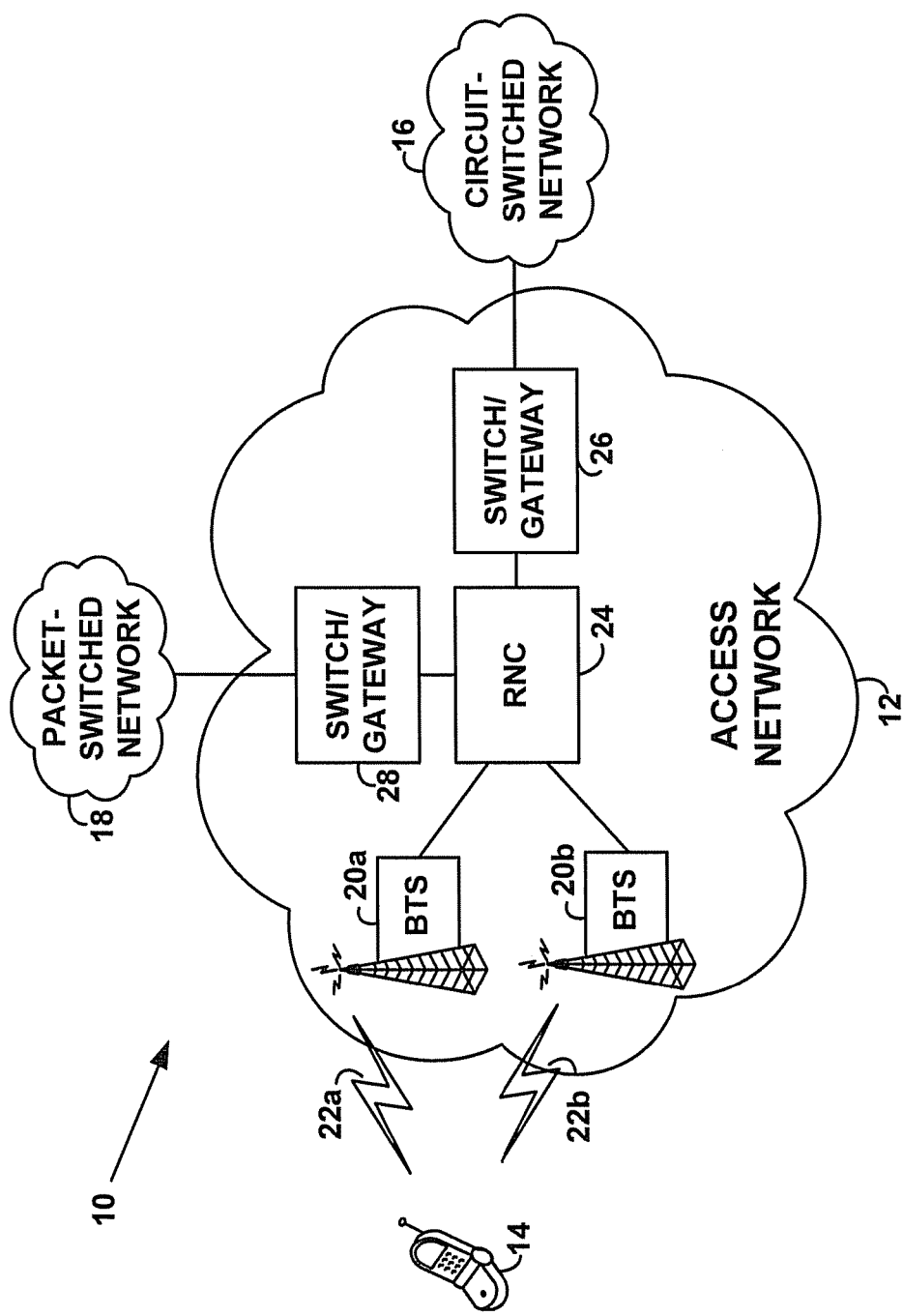
FIG. 1 is a simplified block diagram of a communication system in which an exemplary method can be implemented.

Referring to the drawings, FIG. 1 is a simplified block diagram of a communications system 10 in which an exemplary method can be implemented. As shown, the system 10 includes an access network 12, which may function to provide connectivity between an access terminal 14, such as a cell phone, PDA, or other wirelessly-equipped device, and one or more transport networks, such as a circuit-switched network 16 (e.g., the public switched telephone network (PSTN)) or a packet-switched network (e.g., the Internet) 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network 12 may include a plurality of base transceiver stations (BTSs) 20, such as a first BTS 20*a* and a second BTS 20*b*. (Although FIG. 1 depicts the access network 12 as including two BTSs, it should be understood that the access network 12 may include more than two BTSs). The BTSs 20 may each be any entity that facilitates communication between an access terminal 14 and the access network 12. In this respect, the BTSs 20 may each function to transmit RF-radiation patterns at one or more carrier frequencies, and the RF-radiation patterns may then provide one or more air interfaces 22 over which an access terminal 14 may communicate with the access network 12. For example, each BTS 20 may transmit omni-directional RF-radiation patterns that provide a single air interface 22. Alternatively, each BTS 20 may transmit directional RF-radiation patterns that provide multiple air interfaces 22.

Each of the one or more air interfaces 22 of a given BTS 20, such as the first BTS 20*a*, may define a corresponding wireless coverage area of the first BTS 20*a*. For example, if the first BTS 20*a* provides a single air interface 22, then the first BTS 20*a* may serve a single wireless coverage area (e.g., a cell). Alternatively, if the first BTS 20*a* provides multiple air interfaces 22, the first BTS 20*a* may serve multiple wireless coverage areas (e.g., sectors). For purposes of illustration, the following description will assume the first BTS 20*a* serves access terminals 14 in a first coverage area (e.g., a first cell) and the second BTS 20*a* serves access terminals 14 in a second coverage area (i.e., a second cell). Further, each of the first and second coverage areas may include one or more sub-coverage areas (e.g., sectors).

The air interfaces 22 of the BTSs 20 may carry communications between the access network 12 and the access terminal 14 according to any of a variety of protocols. For example, the air interfaces 22 may carry communications according to CDMA (e.g., 1xRTT or 1xEV-DO (IS-856)), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels for carrying different types of communications between the access terminal 14 and the access network 12. For example, each air interface 22 may include forward-link channels (e.g., control channels, forward-traffic channels, etc.) for carrying forward-link communications from the access network 12 to the access terminal 14, as well as reverse-link channels (e.g., access channels, reverse-traffic channels, etc.) for carrying reverse-link communications from the access terminal 14 to the access network 12.

Each BTS 20 of the access network 12 may then couple to a radio network controller (RNC) 24, which may function to communicate with each BTS 20 and control aspects of the BTSs 20 as well as aspects of the air-interface communication with the access terminal 14. (Although FIG. 1 depicts the access network 12 as including one RNC 24, it should be understood that the access network 12 may include more than one RNC 24, in which case each RNC 24 may couple to a subset of the BTSs 20 in the access network 12. Further, although the BTSs 20 and the RNC 24 are depicted as separate entities, it should be understood that the RNC 24 and one or more BTSs 20 may be incorporated into a single entity). For example, the RNC 24 may control assignment of air-interface traffic channels to the access terminal 14. As another example, the RNC 24 may control aspects of the access terminal 14 switching between sectors and/or cells of the access network 12. As yet another example, the RNC 24 may facilitate communication between BTSs 20 of the access network 12, such as communication between the first BTS 20*a* and the second BTS 20*b*. Other examples are possible as well.

The RNC 24 may then couple to a switch/gateway 26, such as a mobile switching center (MSC), which may provide connectivity with the circuit-switched network 16. Further, the RNC 24 may couple to a switch/gateway 28, such as a packet data serving node (PDSN), which may provide connectivity with the packet-switched network 18. In this respect, the RNC 24 may additionally include a packet control function (PCF) for controlling packet-data communications. Accordingly, with this general arrangement, the access network 12 may facilitate communications between two access terminals 14 in the access network 12, as well as communications between a given access terminal 14 in the access network 12 and a communication device on the circuit-switched network 16 and/or the packet-switched network 18.

In a preferred example, the access terminals 14 will communicate with the access network 12 according to an IS-856 protocol, such as IS-856 Rev. 0 or IS-856 Rev. A. In operation, an IS-856 access terminal 14 may regularly monitor pilot signals emitted by the access network 12 for each coverage area within the access terminal's vicinity, to determine signal conditions (e.g., measured as a carrier-to-interference (C/I) ratio, or a signal-to-interference-plus-noise ratio (SINR)) for those coverage areas. Based on the determined signal conditions, the access terminal 14 may maintain a dynamic list of coverage areas, known as the access terminal's "active set," which typically includes the strongest coverage area(s) of the access network 12 as detected by the access terminal 14. At any one time, an access terminal 14 may be requesting and receiving service from the access network 12 in a single "serving" coverage area (and thus from a single serving BTS), which the access terminal 14 selects from its active set. Typically, the access terminal 14 will be requesting and receiving service in the coverage area with the best signal conditions (i.e., the "strongest" coverage area). An IS-856 access terminal 14 may use two reverse-link channels to communicate its coverage area selection to the access network 12: a "data rate control" (DRC) reverse-link channel and a "data source control" (DSC) reverse-link channel.

Over the DRC channel, an IS-856 access terminal 14 may continuously send the access network 12 transmissions that each indicate (a) a coverage area in which the access terminal 14 is currently requesting data and (b) a rate at which the access terminal is currently requesting data. Every DRC-channel transmission consists of a specific number of consecutive IS-856 DRC messages, each occupying a single DRC channel timeslot, and thus every DRC-channel transmission occupies the specific number of DRC-channel timeslots (i.e., an access terminal 14 must send DRC messages in multiples of the specific number). In IS-856, the specific number is a system parameter known as "DRCLength," and may have a value of four as an example. Each IS-856 DRC message of a given DRC-channel transmission may include (i) a "DRC cover," which indicates a sector, and thus a cell, in which the access terminal 14 is currently requesting data, and (ii) a "DRC value," which indicates a data rate requested by the access terminal 14 in the selected sector. In IS-856, every DRC message of a given DRC-channel transmission must have the same DRC cover and value. As such, a current IS-856 access terminal 14 can change its DRC cover and/or value only after sending every message of a given DRC-channel transmission (i.e., an access terminal 14 can only change its DRC cover and/or value every DRCLength consecutive DRC messages).

Over the DSC channel, an IS-856 access terminal 14 may continuously send the access network 12 transmissions that each indicate a coverage area in which the access terminal 14 will be requesting data after the transmission. (It should be understood that because DRC-channel transmissions and DSC-channel transmissions occupy different channels, the access terminal 14 may send, and the access network 12 may thus receive, DRC-channel transmissions and DSC-channel transmissions substantially simultaneously). Every DSC-channel transmission consists of a specific number of consecutive IS-856 DSC messages, each occupying a single DSC-channel timeslot, and thus every DSC-channel transmission occupies the specific number of DSC-channel timeslots (i.e., an access terminal 14 must send DSC messages in multiples of the specific number). In IS-856, the specific number is a system parameter known as "DSCLength," and may have a value of sixty-four as an example. Each DSC message of a given DSC-channel transmission may then include a "DSC cover," which indicates the coverage area in which the access terminal 12 will be requesting data after the given DSC-channel transmission. In IS-856, every DSC message of a given DSC-channel transmission must have the same DSC cover. As such, a current IS-856 access terminal 14 can only change its DSC Cover after sending every DSC message in a given DSC-channel transmission (i.e., an access terminal 14 may only change its DSC cover every DSCLength consecutive DSC messages).

As indicated above, an IS-856 access terminal 14 may use the DRC channel to request data from the access network 12 in a selected coverage area. Upon receiving each DRC-channel transmission from the access terminal 14, a given BTS 20 of the access network 12 may first determine whether the access terminal is requesting service from the given BTS's coverage area, such as by determining whether the given BTS's coverage area is indicated by the DRC cover of the DRC-channel transmission. The given BTS 20 may then identify the data rate being requested by the access terminal 14 in the indicated coverage area, such as by identifying the data rate indicated by the DRC value of the DRC-channel transmission. Once the given BTS 20 identifies the requested data rate, the given BTS 20 may then identify the maximum number of timeslots necessary to transmit data to the access terminal 14 at the requested data rate. In this respect, the higher the requested data rate, the fewer the timeslots, and thus in theory the quicker the data transmission will occur to the access terminal 14.

After identifying the maximum number of timeslots necessary to transmit data to the access terminal 14 at the requested data rate, the given BTS 20 may allocate that number of timeslots for transmission of each data packet to the access terminal 14. The given BTS 20 may then attempt transmission of each packet to the access terminal 14 in non-consecutive interlaced timeslots (e.g., every $4^{th}$ timeslot), adding more error correction coding in each successive timeslot and/or transmitting various portions of the packet with various error correction coding in each successive timeslot. For instance, if the packet payload comprises the elements ABCD, the access network may transmit in the first allocated timeslot the full payload ABCD plus some error correction coding. If that transmission is insufficient, the access network may then transmit in the next allocated timeslot a portion of the payload, such as ABC, plus some additional error correction coding. And if that transmission is still insufficient, the access network may then transmit in the next timeslot another portion of the payload, such as BDC, plus more substantial error correction coding. This process would continue until the packet transmission is successful or until the allocated number of timeslots is exhausted (in which case the transmission would have failed).

During this packet transmission process, for each allocated timeslot that does not result in the access terminal 14 having successfully received or uncovered the complete packet payload, the access terminal 14 may transmit a negative acknowledgement (NACK) to the access network 12, which prompts the given BTS 20 to keep transmitting the packet in any allocated timeslots that remain. On the other hand, once the access terminal 14 receives the complete packet, the access terminal 14 may transmit a positive acknowledgement (ACK) to the access network 12, which notifies the given BTS 20 that transmission of the packet was successful. If successful receipt of a given packet occurs before the allocated number of timeslots have passed, the given BTS 20 may then proceed to transmitting the next packet, saving timeslot resources by not having to re-transmit the given packet or a portion of the given packet again.

In IS-856, when an access terminal 14 that has been requesting and receiving service in a first coverage area discovers that a second coverage area is exhibiting better signal conditions (e.g., a higher SINR or C/I), the access terminal 14 may decide to switch its selection of serving coverage area. In this respect, the access terminal 14 may notify the access network 12 of its decision to switch from requesting service in the first coverage area to requesting service in the second coverage area. In turn, the access network 12 may function to "hand off" service of the access terminal 14 from the first coverage area to the second coverage area. The process of the access terminal 14 requesting a coverage area switch and the access network 12 responsively facilitating the coverage area switch may occur in a variety of ways.

In one example, an IS-856 access terminal 14 may use the DRC channel and DSC channel to request a switch from a first coverage area to a second coverage area. In particular, after deciding to switch from requesting data in the first coverage area to requesting data in the second coverage area, the access terminal 14 may switch from sending DSC-channel transmissions indicating the first coverage area to sending DSC-channel transmissions indicating second coverage area, thus notifying the second coverage area's BTS 20 of the access terminal's decision to switch to the second coverage area. While sending a first DSC-channel transmission indicating the second coverage area, the access terminal 14 may also continue sending, and the first coverage area's BTS 20 may thus continue receiving, DRC-channel transmissions that indicate the first coverage area. As such, the access terminal 14 may continue receiving data in the first coverage area while the second BTS 20b prepares to serve access terminal 14 in the second coverage area.

At some point during the first DSC-channel transmission indicating the second coverage area, the access terminal 14 may switch from sending DRC-channel transmissions indicating the first coverage area to sending DRC-channel transmissions that do not indicate any coverage area, thus notifying the first BTS 20a to stop serving the access terminal 14. Once the access terminal 14 has finished sending the entire first DSC-channel transmission indicating the second coverage area (i.e., after DSCLength timeslots), the access terminal 14 may then begin requesting data in the second coverage area by beginning to send DRC-channel transmissions indicating the second coverage area. Assuming the DSCLength value provides the second coverage area's BTS 20 sufficient time to prepare to serve the access terminal 14, the second coverage area's BTS 20 may then begin serving the access terminal 14 in the second coverage area without any significant delay.

One current drawback to the above process for switching coverage areas, however, is that the access terminal 14 cannot begin requesting data in the second coverage area while it is still receiving data in the first coverage area. In particular, if the access terminal 14 has not fully received a data packet in the first coverage area at the time that it has finished sending the entire first DSC-channel transmission indicating the second coverage area (i.e., after DSCLength timeslots), the access terminal 14 cannot begin sending DRC-channel transmissions indicating the second coverage area. Instead, the access terminal 14 must continue sending DRC-channel transmissions indicating no coverage area until after the access terminal 14 has fully received the current data packet in the first coverage area. As a result, the switch from requesting and receiving data in the weaker first coverage area to requesting and receiving data in the stronger second coverage area may be delayed, thus negatively impacting the overall rate at which the access terminal 14 receives data from the access network 12. This delay may be significant when the access terminal 14 was requesting a low data rate in the first coverage area, thus resulting in each data packet transmission to the access terminal 14 occupying a large number of total timeslots.

The exemplary methods described herein are intended to reduce this delay. As described in more detail below, in response to deciding to switch coverage areas, an access terminal 14 operating according to an exemplary method may begin requesting data in the first coverage area at an increased data rate (e.g., a maximum data rate supported by the access network 12), thus causing the access network 12 to reduce the number of timeslots allocated for each data packet to the access terminal 14. As a result, the access network 12 may finish sending data packets to the access terminal 14 in the first coverage area—and the access terminal 14 may finish receiving the data packets—more quickly. In turn, the access terminal 14 can begin requesting and receiving data in the second coverage area more quickly.

Figure 2:
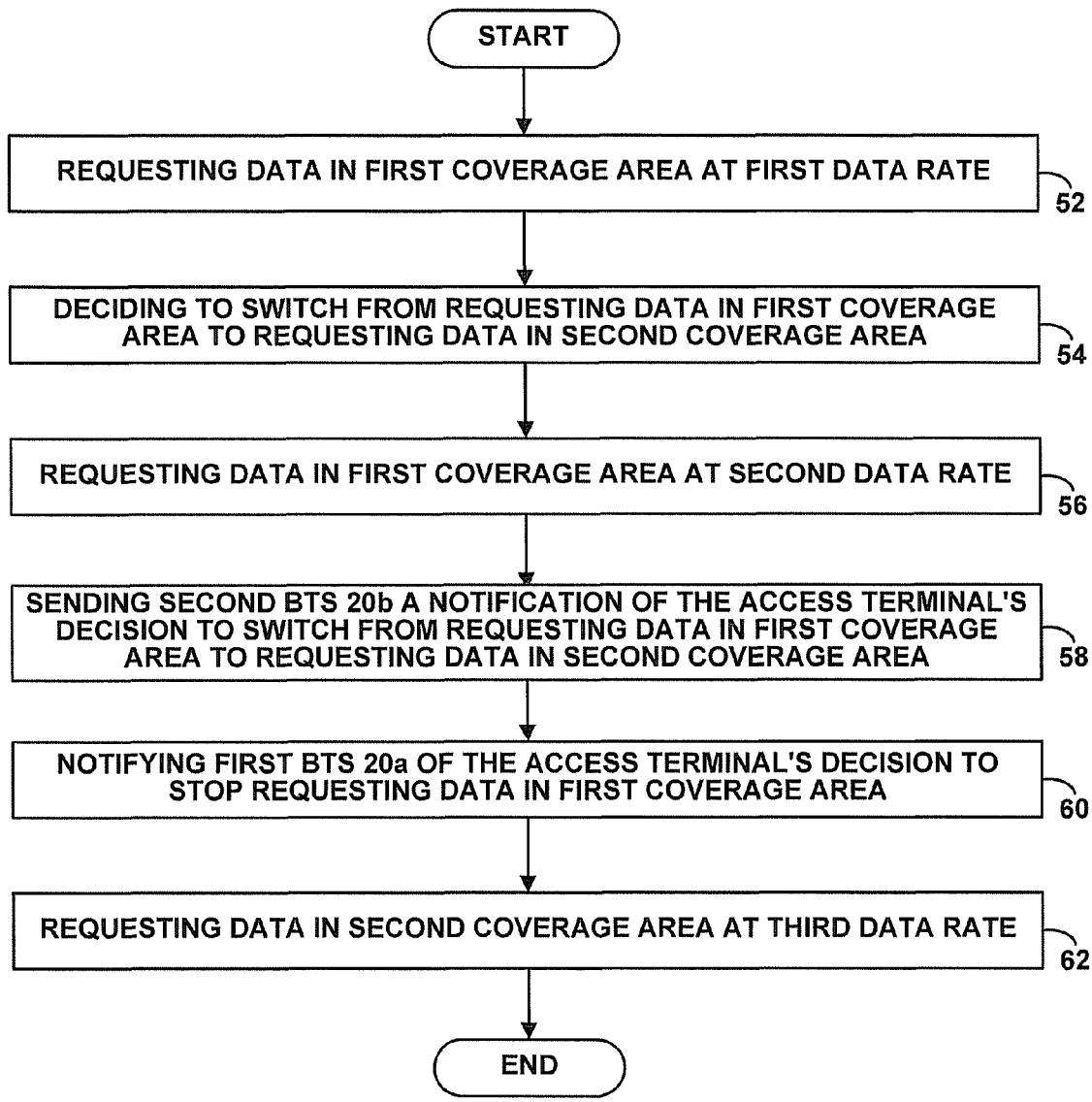
FIG. 2 is a flow chart depicting an exemplary method of operation of an access terminal in an access network.
Figure 3:
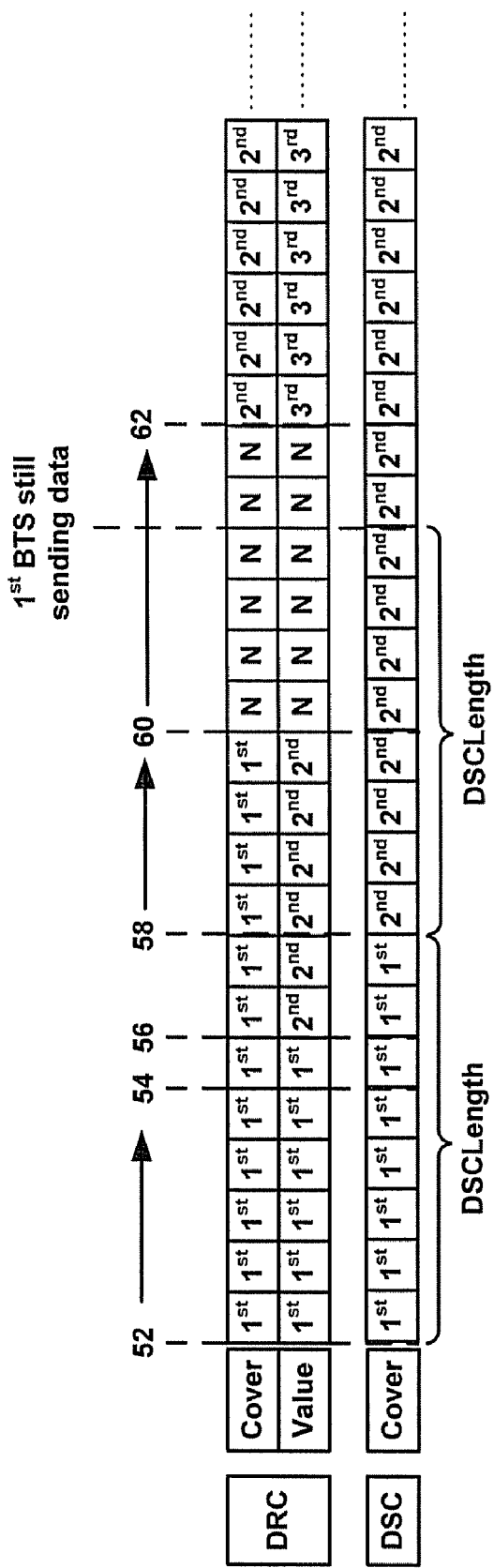
FIG. 3 is an exemplary timeline of a first reverse-link channel and a second reverse-link channel between an access terminal operating according to the exemplary method of FIG. 2 and an access network.

An exemplary method, carried out by the access terminal 14, of switching between coverage areas of the access network 12 will now be described with reference to FIG. 2 and FIG. 3. FIG. 2 is a flow chart depicting an exemplary method, carried out by an access terminal 14, of switching between coverage areas of an access network 12. FIG. 3 is an exemplary timeline of a first reverse-link channel and a second reverse-link channel between the access terminal 14 operating according to the method of FIG. 2 and the access network 12. For purposes of illustration, FIG. 3 depicts the first reverse-link channel as a DRC channel with a DRCLength of 2 timeslots and the second reverse-link channel as a DSC channel with a DSCLength of 8 timeslots.

At step 52, the access terminal 14 may be requesting data in a first coverage area of the access network 12 at a first data rate. For example, the access terminal 14 may be sending to the access network 12, on a first reverse-link channel, one or more transmissions each requesting data in the first coverage area at the first data rate. Preferably, the access terminal 14 will determine the first data rate based on at least one signal condition of the first coverage area (e.g., SINR, C/I, etc.). For example, based on at least one measured signal condition of the first coverage area, the access terminal 14 may determine a highest data rate that is sustainable in the first coverage area. The access terminal 14 may then use this highest sustainable data rate as the first data rate at which the access terminal 14 requests data in the first coverage area. Alternatively, the access terminal 14 may decrease the highest sustainable data rate by a predefined offset, and the access terminal 14 may then use this decreased data rate as the first data rate at which the access terminal 14 requests data in the first coverage area. Other techniques for determining the first data rate based on at least one signal condition of the first coverage area may exist as well. (It should also be understood that the access terminal 14 may change the rate at which it requests data in the first coverage area as the first coverage area's signal conditions change.)

In one example, the first reverse-link channel will be an IS-856 DRC channel, in which case each transmission will occupy DRCLength timeslots and consist of DRCLength consecutive IS-856 DRC messages. In turn, each IS-856 DRC message will preferably include a DRC cover indicating the first coverage area and a DRC value indicating the first data rate at which the access terminal 14 requests data in the first coverage area. When determining the DRC value transmitted to the access network 12, the access terminal 14 may first determine a highest sustainable data rate in the first coverage area, as described above. In turn, the access terminal 14 may select a DRC value that corresponds to the highest sustainable data rate, such as by using a table stored in memory. The access terminal 14 may then use the selected DRC value as the DRC value transmitted to the access network 12. Alternatively, the access terminal 14 may adjust the selected DRC value by a predefined offset value, known as DRCOffset, and the access terminal 14 may then use the adjusted DRC value as the DRC value transmitted to the access network 12. Other examples for determining the DRC value transmitted to the access network 12 may exist as well.

In response to receiving the access terminal's one or more transmissions requesting data in the first coverage area at the first data rate, the first BTS 20a may prepare to send data to the access terminal 14 at the first date rate. For example, the first BTS 20*a* may allocate, for each data packet to the access terminal 14, a number of non-consecutive interlaced timeslots that corresponds to the first data rate. Thereafter, the first BTS 20*a* may send any data packet destined for the access terminal 14 over the allocated number of timeslots. Thus, as a result of sending the one or more first reverse-link channel transmissions requesting data in the first coverage area at the first data rate, the access terminal 14 may receive data in the first coverage area at the first data rate.

While requesting data in the first coverage area, the access terminal 14 may also be sending to the access network 12, on a second reverse-link channel, one or more transmissions each indicating the first coverage area as the coverage area in which the access terminal 14 will be requesting data after sending the transmission. In one example, the second reverse-link channel will be an IS-856 DSC channel, in which case each transmission will occupy DSCLength timeslots and consist of DSCLength consecutive IS-856 DSC messages. In turn, each IS-856 DRC message will preferably include a DSC cover indicating the first coverage area as the coverage area in which the access terminal 14 will be requesting data after sending the transmission.

At step 54, the access terminal 14 may then decide to switch from requesting data in the first coverage area to requesting data in the second coverage area. In one aspect, the access terminal 14 may decide to switch from requesting data in the first coverage area to requesting data in the second coverage area based on signal conditions in the first and second coverage areas. For example, the access terminal 14 may decide to switch from requesting data in the first coverage area to requesting data in the second coverage area in response to detecting that a given signal condition (e.g., C/I or SINR) of the second coverage area is sufficiently better (e.g., 3 dB better) than the given signal condition of the first coverage area. Typically, the access terminal 14 determines the signal conditions of the first and second coverage areas based on pilot signal measurements.

In another aspect, the access terminal 14 may decide to switch from requesting data in the first coverage area to requesting data in the second coverage area based on a location of the access terminal 14 relative to the first and second coverage areas. For example, the access terminal 14 may decide to switch from requesting data in the first coverage area to requesting data in the second coverage area in response to determining that the access terminal's location is sufficiently closer to a representative location of the second coverage area (e.g., a centroid) than to a representative location of the first coverage area (e.g., a centroid). In this respect, the access terminal 14 may determine its location and the representative locations of the first and second coverage areas using any technique now known or later developed. The access terminal 14 may decide to switch from requesting data in the first coverage area to requesting data in the second coverage area in response to other triggers as well.

At step 56, in response to deciding to switch from requesting data in the first coverage area to requesting data in the second coverage area, the access terminal 14 may begin requesting data in the first coverage area at a second data rate, where the second data rate is higher than the first data rate. For example, the access terminal 14 may begin sending to the access network 12, on the first reverse-link channel, one or more transmissions each requesting data in the first coverage area at the second data rate. In this respect, if the first reverse-link channel is an IS-856 DRC channel, the transmissions will preferably include a DRC cover indicating the first coverage area and a DRC value indicating the second data rate. (It should be understood that the access terminal 14 cannot change its DRC value from indicating the first data rate to indicating the second data rate until the next DRC-channel transmission).

In one aspect, the second data rate may be a predefined value, such as a maximum rate at which the access terminal 14 may request data from the access network 12. In this respect, the predefined value may be configurable, and may be selected to balance a desire to facilitate a coverage area switch more quickly with a desire to facilitate successful data transmission during the coverage area switch. In another aspect, the access terminal 14 may determine the second data rate dynamically based on the first data rate. For example, the access terminal 14 may determine the second data rate by increasing the first data rate in some predefined manner. As another example, if the first data rate is determined using a predefined offset value (e.g., DRCOffset), the access terminal 14 may determine the second data rate by suspending application of the predefined offset value. The second data rate may take other forms as well.

In response to receiving the access terminal's one or more transmissions requesting data in the first coverage area at the second data rate, the first BTS 20*a* may prepare to send data to the access terminal 14 at the second data rate. For example, the first BTS 20*a* may allocate, for each data packet to the access terminal 14, a number of non-consecutive interlaced timeslots that corresponds to the second data rate. In this respect, because the second data rate is higher than the first data rate, the first BTS 20*a* will reduce the number of timeslots allocated for each data packet destined to the access terminal 14. Thereafter, the first BTS 20*a* may send any data packet destined for the access terminal 14 over the reduced number of allocated timeslots. Thus, as a result of sending on the one or more first reverse-link channel transmissions requesting data in the first coverage area at the second data rate, the access terminal 14 may receive data in the first coverage area at the second data rate.

At step 58, in response to deciding to switch from requesting data in the first coverage area to requesting data in the second coverage area, the access terminal 14 may also send to the second BTS 20*b* a notification of the access terminal's decision to switch from requesting data in the first coverage area to requesting data in the second coverage area. For example, the access terminal 14 may begin sending to the access network 12, on the second reverse-link channel, a first transmission indicating the second coverage area as the coverage area in which data will be requested after the at least one transmission. In this respect, if the second reverse-link channel is an IS-856 DSC channel, the first transmission will preferably include a DSC cover indicating the second coverage area. (It should be understood that the access terminal 14 cannot change its DSC cover from indicating the first coverage area to indicating the second coverage until the next DSC-channel transmission).

In response to receiving the access terminal's second reverse-link channel transmission indicating the second coverage area, the second BTS 20*b* may begin preparing to serve the access terminal 14. For example, the second BTS 20*b* may request and being receiving from the RNC 24 data destined for the access terminal 14, which the second BTS 20*b* may queue for possible future transmission to the access terminal 14.

At step 60, before the access terminal 14 begins requesting data in the second coverage area, the access terminal 14 may send a request to stop receiving data in the first coverage area. For example, the access terminal 14 may begin sending to the access network 12, on the first reverse-link channel, one or more transmissions that do not request data from any coverage area of the access network 12. In this respect, if the first reverse-link channel is an IS-856 DRC channel, the transmissions will preferably include a DRC cover known as a "null cover," which is a special DRC cover that does not indicate any coverage area of the access network 12. Further, the first reverse-link channel is an IS-856 DRC channel and the second reverse-link channel is an IS-856 DSC channel, the access terminal 14 will preferably begin sending the DRC-channel transmissions with the null cover when there are 2*DRCLength timeslots remaining in the at least one DSC-channel transmission indicating the second coverage area.

In response to receiving the access terminal's one or more first reverse-link channel transmissions that do not request data from any coverage area, the first BTS 20*a* may stop serving the access terminal 14. For example, the first BTS 20*a* may release any timeslots previously allocated to the access terminal 14 and stop sending data packets to the access terminal 14. If the first BTS 20*a* is currently in the process of sending a data packet to the access terminal 14, however, the first BTS 20*a* will finish sending that final data packet to the access terminal 14.

The earliest the access terminal 14 can begin requesting data in the second coverage area is at the completion of the first transmission on the second reverse-link channel indicating the second coverage area. As described above, however, the access terminal 14 typically cannot begin requesting data in the second coverage area while it is still receiving data in the first coverage area. In this respect, as depicted in FIG. 3, if the access terminal 14 is still receiving data in the first coverage area when it finishes sending the second reverse-link channel transmission indicating the second coverage area, the access terminal 14 may continue sending one or more first reverse-link channel transmissions that do not request data from any coverage area of the access network 12 (e.g., DRC-channel transmissions with null covers), thus delaying the coverage area switch. As described above, the exemplary method may reduce this delay. In particular, because the access terminal 14 operating according to the exemplary method requests an increased data rate when it decides to switch coverage areas, the first BTS 20*a* may reduce the number of timeslots allocated for each data packet to the access terminal 14. As a result, the first BTS 20*a* should finish sending data to the access terminal 14—and the access terminal 14 should finish receiving data from the access network 12—more quickly. In turn, the access terminal 14 can begin requesting data in the second coverage area more quickly.

At step 62, after fully sending to the second BTS 20*b* the notification of its decision to switch coverage areas and fully receiving a final data packet from the first BTS 20*a*, the access terminal 14 may begin requesting data in the second coverage area at a third data rate. For example, the access terminal 14 may begin sending to the access network 12, on the first reverse-link channel, one or more transmissions each requesting data in the second coverage area at the third data rate. In this respect, if the first reverse-link channel is an IS-856 DRC channel, the transmissions will preferably include a DRC cover indicating the second coverage area and a DRC value indicating the third data rate. Similar to the first data rate, the access terminal 14 will preferably determine the third data rate based on at least one signal condition of the second coverage area (e.g., SINR, C/I, etc.).

In response to receiving the access terminal's one or more transmissions requesting data in the second coverage area at the third data rate, the second BTS 20*b* may prepare to send data to the access terminal 14 at the third date rate. For example, the second BTS 20*b* may allocate, for each data packet to the access terminal 14, a number of non-consecutive interlaced timeslots that corresponds to the third data rate. Thereafter, the second BTS 20*b* may send any data packet destined for the access terminal 14 over the allocated number of timeslots. Thus, as a result of sending the one or more first reverse-link channel transmissions requesting data in the second coverage area at the third data rate, the access terminal 14 may begin receiving data in the second coverage area at the third data rate.

Figure 4:
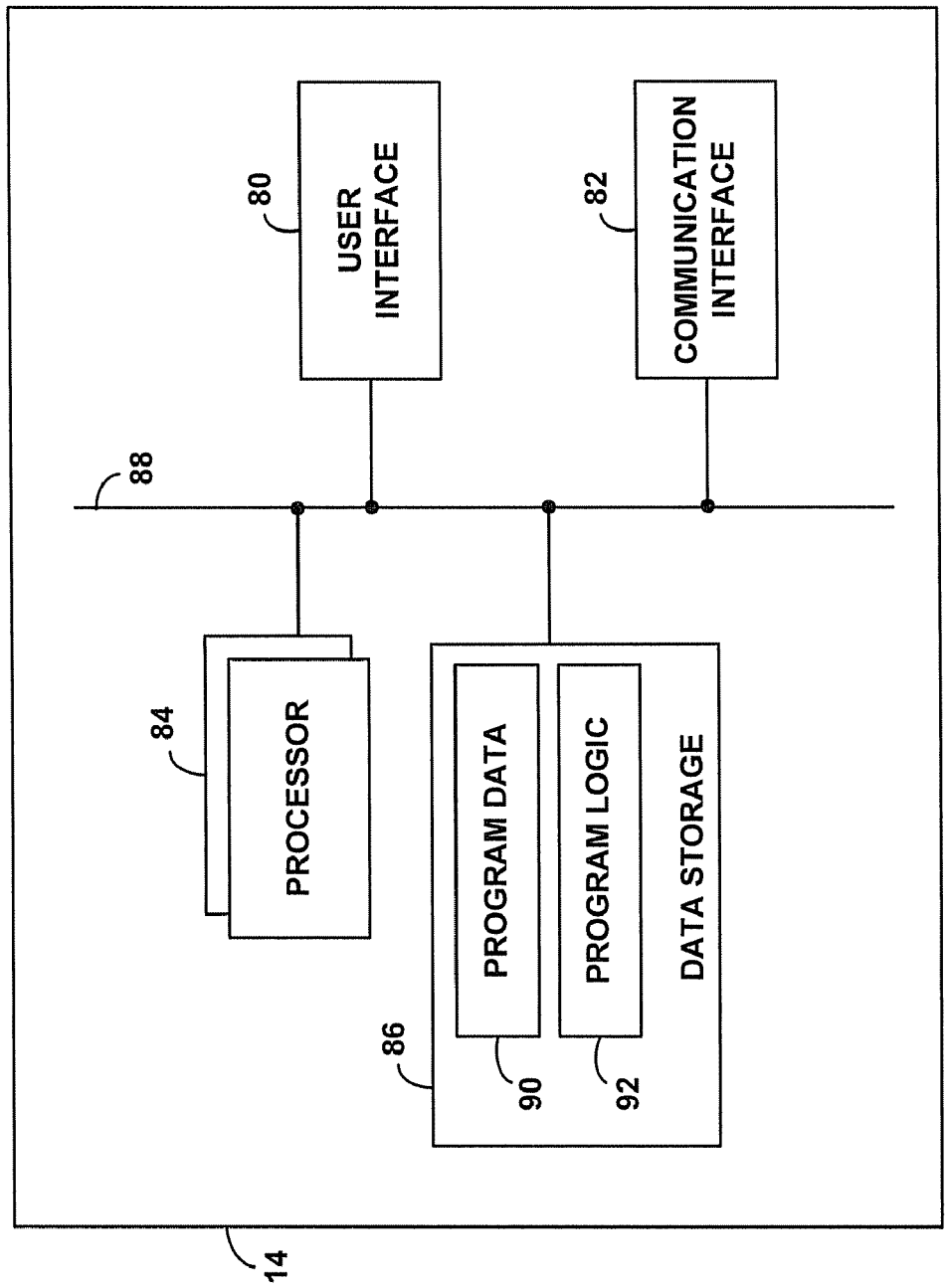
FIG. 4 is a simplified block diagram showing functional components of an exemplary access terminal capable of carrying out the exemplary method of FIG. 2.

FIG. 4 is a simplified block diagram showing functional components of an exemplary access terminal 14 capable of carrying out the exemplary method of FIG. 2. As shown in FIG. 4, the exemplary access terminal 14 may include a user interface 80, a communication interface 82, a processor 84, and data storage 86, all linked together via a system bus, network, or other connection mechanism 88.

Referring to FIG. 4, the user interface 80 preferably functions to facilitate user interaction with the exemplary access terminal 14. The user interface 80 may include a variety of input components, such as a touch screen, a navigation pad, a multi-functional button, a thumb wheel, a keyboard or keypad, and/or a microphone for instance. Additionally, the user interface 80 may include a variety of output components, such as a display screen and/or a speaker for instance. Additionally yet, the user interface 80 may include signal processing components, such as A-D and D-A circuitry. The user interface 80 may include other components for facilitating user interaction with the exemplary access terminal 14 as well.

The communication interface 82 preferably functions to communicatively couple the exemplary access terminal 14 to the access network 12, and more particularly the BTSs 20 of the access network 12. In this respect, the communication interface 82 will preferably facilitate forward-link and reverse-link communication with the access network 12. Further, the communication interface 82 will preferably support multiple channels on the forward-link and reverse-link, including a first reverse-link channel (e.g., a DRC channel) and a second-reverse link channel (e.g., a DSC channel).

The communication interface 82 may take the form of an Ethernet network interface module, a chipset and antenna adapted to facilitate wireless communication according a desired protocol (e.g., IS-856), and/or any other form that provides for wireless and/or wired communication. The communication interface 82 may also include multiple communication interfaces, such as one with which the exemplary access terminal 14 sends reverse-link communications and one with which the exemplary access terminal 14 receives forward-link communications. Other configurations are also possible.

The processor 84 may comprise one or more general purpose microprocessors and/or dedicated signal processors. (The term "processor" encompasses either a single processor or multiple processors that could work in combination.) Data storage 86, in turn, may comprise memory and/or other storage components, such as optical, magnetic, organic or other memory or disk/disc storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 would be maintained in data storage 86 separate from the program logic 92, for easy updating and reference by the program logic 92.

Program data 90 may contain information related to the first and second reverse-link channels. For example, program data 90 may contain an indication of a coverage area in which the exemplary access terminal 14 is currently requesting data (e.g., a DRC cover) and a rate at which the exemplary access terminal 14 is requesting data (e.g., a DRC value), which the exemplary access terminal 14 may send via the first reverse-link channel. In this respect, the rate at which the exemplary access terminal 14 is requesting data may be a predefined data rate or a data rate determined based on signal conditions in the access network 12. As another example, program data 90 may contain an indication of a coverage area in which the exemplary access terminal 14 will be requesting data in the near future (e.g., a DSC cover), which the exemplary access terminal 14 may send via the second reverse-link channel. As yet another example, program data 90 may contain an indication of a number of timeslots that transmissions on the first reverse-link channel and/or the second reverse-link channel occupy. Other examples are possible as well.

Program data 90 may additionally contain information related to the coverage areas detected by the exemplary access terminal 14. For example, program data 90 may contain identifiers of the coverage areas detected by the exemplary access terminal 14. As another example, program data 90 may contain data indicative of one or more signal conditions (e.g., SINR, C/I, etc.) of the coverage areas detected by the exemplary access terminal 14. As yet another example, program data 90 may contain indications of the highest sustainable data rates in the coverage areas detected by the exemplary access terminal 14. As a further example, program data 90 may contain representative locations of the coverage areas detected by the exemplary access terminal 14. Other examples are possible as well.

Program logic 92 preferably comprises machine-language instructions that may be executed or interpreted by processor 84 to carry out functions in accordance with the exemplary method described in FIG. 2. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 to (a) request from the access network 12 data in a first coverage area at a first data rate, which is determined based on at least one signal condition of the first coverage area, (b) decide to switch from requesting data in a first coverage area to requesting data in a second coverage area, (c) in response to deciding to switch from requesting data in the first coverage area to requesting data in the second coverage area, (1) request data in the first coverage area at an increased second data rate and (2) send to the access network a notification of the decision to switch from requesting data in a first coverage area to requesting data in a second coverage area, and (d) after sending the notification, request data in the second coverage area at a third data rate, which is determined based on at least one signal condition of the second coverage area.

Exemplary embodiments have been described above. Those skilled in the art will understand, however, that changes and modifications may be made to the embodiments described without departing from the true scope and spirit of the present invention, which is defined by the claims.

We claim:

1. A method, carried out by an access terminal, of switching between coverage areas of an access network, the method comprising:

requesting, from an access network, data in a first coverage area at a first data rate, wherein the first data rate is determined based on at least one signal condition of the first coverage area;

deciding to switch from requesting data in a first coverage area to requesting data in a second coverage area;

in response to deciding to switch from requesting data in the first coverage area to requesting data in the second coverage area, (a) requesting data in the first coverage area at a second data rate, wherein the second data rate is higher than the first data rate, and (b) sending to the access network a notification of the decision to switch from requesting data in a first coverage area to requesting data in a second coverage area; and after sending the notification, requesting data in the second coverage area at a third data rate, wherein the third data rate is determined based on at least one signal condition of the second coverage area.

2. The method of claim 1, wherein the first data rate comprises a highest sustainable data rate in the first coverage area.

3. The method of claim 1, wherein the first data rate comprises a decreased version of a highest sustainable data rate in the first coverage area.

4. The method of claim 1, where the at least one signal condition of the first coverage area and the at least one signal condition of the second coverage area each comprises a carrier-to-interference ratio.

5. The method of claim 1, where the at least one signal condition of the first coverage area and the at least one signal condition of the second coverage area each comprises a signal-to-interference-plus-noise ratio.

6. The method of claim 1, wherein the second data rate comprises a predefined data rate.

7. The method of claim 6, wherein the predefined data rate comprises a maximum data rate supported by the access network.

8. The method of claim 1, wherein the second data rate comprises an increased version of the first data rate.

9. The method of claim 1, wherein requesting data in the second coverage area at the third data rate comprises requesting data in the second coverage area at the third data rate after receiving a final data packet from the access network in the first coverage area at the second data rate.

10. The method of claim 1, wherein:

requesting data in the first coverage area at the first data rate comprises sending to the access network, on a first reverse-link channel, one or more transmissions each requesting data in the first coverage area at the first data rate;

requesting data in the first coverage area at the second data rate comprises sending to the access network, on the first reverse-link channel, one or more transmissions each requesting data in the first coverage area at the second data rate;

sending the notification of the decision to switch from requesting data in a first coverage area to requesting data in a second coverage area comprises sending to the access network, on a second reverse-link channel, a first transmission indicating that data will be requested in the second coverage area after the first transmission; and requesting data in the second coverage area at the third data rate comprises sending to the access network, on the first reverse-link channel, one or more transmissions each requesting data in the second coverage area at the third data rate.

11. The method of claim 10, wherein the first reverse-link channel comprises a data rate control (DRC) channel, and the second reverse-link channel comprises a data source control (DSC) channel.

12. The method of claim 1, further comprising:
before requesting data in the second coverage area, sending to the access network a request to stop receiving data in the first coverage area.

13. The method of claim 12, wherein sending the request to stop receiving data in the first coverage area comprises sending to the access network, on a first reverse-link channel, one or more transmissions that do not request data in any coverage area.

14. A method, carried out by an access terminal, of switching between coverage areas of an access network, the method comprising:
sending to an access network, on a data rate control (DRC) channel, one or more transmissions each with a DRC cover indicating a first coverage area and DRC value indicating a first data rate, wherein the first data rate is determined based on at least one signal condition of the first coverage area;
deciding to switch from requesting data in a first coverage area to requesting data in a second coverage area;
in response to deciding to switch from requesting data in the first coverage area to requesting data in the second coverage area, sending to the access network (a) on the DRC channel, one or more transmissions each with a DRC cover indicating the first coverage area and a DRC value indicating a second data rate, wherein the second data rate is higher than the first data rate, and (b) on a data source control (DSC) channel, a first transmission with a DSC cover indicating the second coverage area; and
after sending the first transmission on the DSC channel, sending to the access network, on the DRC channel, one or more transmissions each with a DRC cover indicating the second coverage area and a DRC value indicating a third data rate, wherein the third data rate is determined based on at least one signal condition of the second coverage area.

15. The method of claim 14, wherein the second data rate comprises a predefined data rate.

16. The method of claim 15, wherein the predefined data rate comprises a maximum data rate supported by the access network.

17. The method of claim 14, wherein the second data rate comprises an increased version of the first data rate.

18. The method of claim 14, further comprising:
before sending the one or more transmissions each with a DRC cover indicating the second coverage area and a DRC value indicating the third data rate, sending to the access network, on the DRC channel, one or more transmissions each with a DRC cover indicating a null.

19. The method of claim 14, wherein sending the one or more transmissions each with a DRC cover indicating the second coverage area and a DRC value indicating the third data rate comprises sending the one or more transmissions each with a DRC cover indicating the second coverage area and a DRC value indicating the third data rate after receiving a final data packet from the access network in the first coverage area at the second data rate.

20. An access terminal comprising:
a communication interface for communicating with an access network;
a processor;
data storage; and
program instructions stored in the data storage and executable by the processor for:
(i) requesting, from the access network, data in a first coverage area at a first data rate, wherein the first data rate is determined based on at least one signal condition of the first coverage area;
(ii) deciding to switch from requesting data in a first coverage area to requesting data in a second coverage area;
(iii) in response to deciding to switch from requesting data in the first coverage area to requesting data in the second coverage area, (a) requesting data in the first coverage area at a second data rate, wherein the second data rate is higher than the first data rate, and (b) sending to the access network a notification of the decision to switch from requesting data in a first coverage area to requesting data in a second coverage area; and
(iv) after sending the notification, requesting data in the second coverage area at a third data rate, wherein the third data rate is determined based on at least one signal condition of the second coverage area.

* * * * *